UNITED STATES PATENT OFFICE.

TERAH M. FREEMAN, OF ST. LOUIS, MISSOURI.

IMPROVEMENT IN THE MANUFACTURE OF VINEGAR.

Specification forming part of Letters Patent No. 59,206, dated October 30, 1866

*To all whom it may concern:*

Be it known that I, TERAH M. FREEMAN, of the city and county of St. Louis, State of Missouri, have invented a new and useful Process of Manufacturing Vinegar; and I do hereby declare that the following is a full and exact description thereof.

The nature of my said invention will, from said description, clearly appear. I will now proceed to describe the same in detail, to fully enable those skilled in the arts to make and use it.

I use mashed grain, employing the usual methods to produce fermentation. The fermented liquor is then placed in a still of the usual form, and by application of heat the liquor is raised to a temperature of 212° Fahrenheit, so that it gives off alcoholic vapors.

I would especially state that in the production of these alcoholic vapors out of fermented liquors from mashed grain there is nothing which I do claim as my invention. Moreover, it is not essential to the success of any subsequent process hereinafter described that any peculiar or special method of producing said alcoholic vapors should be used.

I next construct a vessel of some non-corrosive material, as a tank or reservoir, placing therein the following ingredients, in about the following proportions: eighty (80) gallons of pure water, three (3) to four (4) gallons of strong mercantile vinegar, and about one-sixth ($\frac{1}{6}$) gallon of ferment or yeast. It is, however, to be understood that the said proportions are to be varied somewhat, in accordance with the standard strength of the vinegar to be produced. Moreover, instead of some of said ingredients, equivalent substances may be substituted.

The capital of the alcohol-still first above mentioned being simply connected with said tank, and the liquor in the still being subjected, as before mentioned, to said temperature of 212° Fahrenheit, the alcoholic vapors from the liquor in the still pass into the liquid of the tank, impregnating the same with alcohol, and at the same time heating the same. This is continued until the temperature of the tank-liquor is raised to between eighty degrees (80°) and eighty-three degrees (83°) Fahrenheit. Said liquor is then drawn off and passed through the usual generators for acidification by the quick process, or it is run into barrels to acidify by slower oxidation. There is in no wise to the exact nature of my invention a necessity for any special process of acidification, any of the numerous processes being practicable to the attainment of vinegar.

It will be seen, therefore, that the process hereinbefore described differs essentially from those processes for manufacturing vinegar now in common use, in the application of the alcoholic vapors directly to the vat or tank containing the vinegar-stock; and I do claim that in the application of said vapors as aforesaid there is great economy of money and of time effected.

In the now usual methods the alcoholic vapors are, after leaving the still, condensed to liquid form. Now, this necessitates a use of large quantities of cold water for producing the abstraction of heat from the vapors necessary to condensation. Such quantities of water in cities are costly, and even when water is easily and cheaply obtained, the formation of the supply, as well as the construction and operation of condenser-vessels, is expensive. After such condensation the alcoholic liquid (usually whisky) is passed into the tank above described, to form the vinegar wort or mash. This necessitates the measurement of proper quantities of alcoholic liquid. Moreover, the temperature of the tank - liquor must now be raised to the proper temperature for acidification—say 80° Fahrenheit. Thus the heat taken from the alcoholic vapors in condensation must be, with additional cost, replaced in the tank-liquor, whereas in the process by me hereinbefore claimed the necessary temperature of the tank-liquor is produced by the alcoholic vapors themselves, and the temperature, when attained, furnishes the test that said tank - liquor has been impregnated with the proper quantity of alcohol.

Lastly, the passage of the alcoholic vapors into the tank-liquor causes the most thorough mixture and contact between the parts of the vinegar-mash, thus insuring a most favorable contact action, which is highly beneficial in following process of oxygenation.

Having thus described my said invention, what I claim is—

The formation of vinegar-mash by adding alcoholic vapors to the liquids used, and usually containing water, vinegar or acetic acid, and ferment, substantially as set forth.

T. M. FREEMAN.

Witnesses:
GEO. P. HERTHEL, Jr.,
M. RANDOLPH.